United States Patent [19]
Freitag et al.

[11] Patent Number: 5,317,083
[45] Date of Patent: May 31, 1994

[54] PROCESS FOR ISOLATING POLYCARBONATES FROM THEIR SOLUTIONS WITH TUBE HAVING CROSS SECTIONAL CONTRICTIONS

[75] Inventors: Dieter Freitag; Claus Wulff; Wolfgang Alewelt; Hermann Kauth, all of Krefeld, Fed. Rep. of Germany

[73] Assignee: Bayer Aktiengesellschaft, Leverkusen, Fed. Rep. of Germany

[21] Appl. No.: 87,908

[22] Filed: Jul. 9, 1993

[30] Foreign Application Priority Data

Jul. 21, 1992 [DE] Fed. Rep. of Germany ........ 4224025

[51] Int. Cl.$^5$ .............................................. C08G 64/40
[52] U.S. Cl. .................................. 528/499; 528/196; 528/502
[58] Field of Search ......................... 528/499, 502, 196

[56] References Cited

U.S. PATENT DOCUMENTS 4,568,418  2/1986  Walko et al. ...................... 528/499

Primary Examiner—Harold D. Anderson
Attorney, Agent, or Firm—Connolly & Hutz

[57] ABSTRACT

The present invention relates to a process for isolating polycarbonates in which a solution of polycarbonate in an organic solvent is dispersed with steam and which is characterized in that the resulting suspension of polycarbonate particles, condensed water and water/solvent vapor is subsequently dried in a tube with cross-sectional constrictions.

6 Claims, 1 Drawing Sheet a)
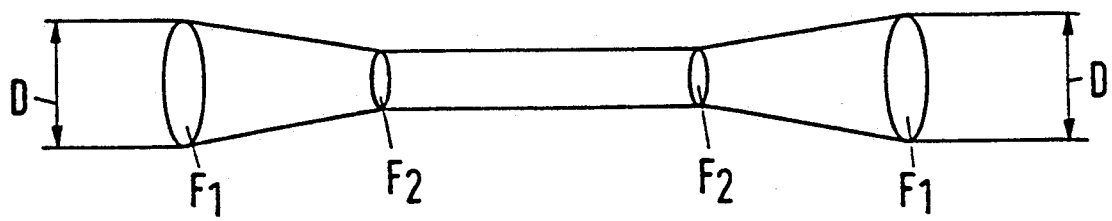
$F_2 = F_1 \cdot (0.4 \text{ to } 0.8)$
b)
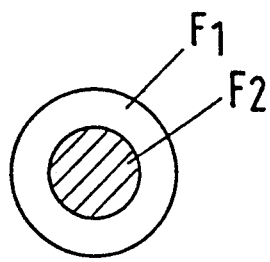 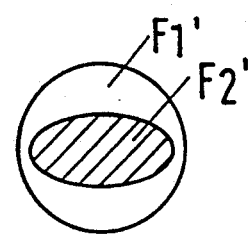
$F_1 = F_1'$  $F_2 = F_2'$  $F_2' = F_1' \cdot (0.4 \text{ to } 0.8)$

PROCESS FOR ISOLATING POLYCARBONATES FROM THEIR SOLUTIONS WITH TUBE HAVING CROSS SECTIONAL CONTRICTIONS

This invention relates to a process for isolating thermoplastic aromatic polycarbonates from their solutions in which a solution of thermoplastic aromatic polycarbonate in an organic solvent is dispersed with steam and which is characterized in that the resulting suspension of polycarbonate particles, condensed water and water/solvent vapor is subsequently dried in a tube with cross-sectional constrictions.

The polycarbonate particles thus obtained are distinguished by the fact that residual solvent can be better removed.

The isolation of polycarbonates from their solutions with steam is known per se.

Thus, U.S. Pat. No. 3,508,339 describes the use of a special nozzle in combination with a mixing chamber, in which polycarbonate solution and steam are combined, and an adjoining tube of constant diameter in which the solvent is removed by drying.

U.S. Pat. No. 4,212,967 (=EP 3996) claims a combination of a nozzle of the De Laval type with a heated tube which increases in diameter from the nozzle.

U.S. Pat. No. 4,568,418 claims a combination of a nozzle and an adjoining agglomeration tube, the tube being characterized by a constant diameter and by at least six semicircular loops.

These known processes give polycarbonate particles which are substantially freed from the organic solvent. However, subsequent drying is necessary to achieve very low residual solvent contents. The necessary conditions, for example the necessary time and the directly time-dependent apparatus volume, play an important part in determining the suitability of the isolation process for application on an industrial scale.

The polycarbonate particles obtained by hitherto known processes are still not entirely satisfactory in regard to their subsequent dryability.

It has now surprisingly been found that the polycarbonate particles obtained in the isolation of thermoplastic aromatic polycarbonates from their solutions with steam can be freed particularly effectively from residual solvent when the polycarbonate solution and the steam are combined, for example in a two-component nozzle, and the polycarbonate particles formed, which are present as a suspension in condensed water and water/solvent vapor, are further freed from solvent in a tube directly adjoining the point at which they are combined, the tube having several cross-sectional constrictions and widening to its original diameter after each constriction.

The polycarbonate particles are separated from the vapor phase, for example in a cyclone, and are then freed from residual solvent in a subsequent drying step.

Thermoplastic aromatic polycarbonates which may be used in the process according to the invention are the known aromatic homopolycarbonates, copolycarbonates and mixtures of these polycarbonates which are derived from the following diphenols: hydroquinone, resorcinol, dihydroxydiphenylene, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, $\alpha,\alpha'$-bis-(hydroxyphenyl)-diisopropyl benzenes and nucleus-alkylated and nucleus-halogenated compounds thereof.

Preferred diphenols are, for example, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)cyclohexane, $\alpha,\alpha'$-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane,1,1-bis-(3,5-dimethyl-4-hydroxyphenyl) -cyclohexane, $\alpha,\alpha'$-bis-(3,5-dimethyl-4-hydroxyphenyl)-p-diisopropylbenzene and 2,2-bis-(3,5-dichloro-4-hydroxyphenyl)-propane, 2,2-bis-(3,5-dibromo-4-hydroxyphenyl)-propane and 1,1-bis-4-hydroxyphenyl)-3,3-dimethyl-5-methyl cyclohexane.

Preferred diphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)propane, 2,2-bis-(3,5-dibromo-4-hydroxyphenyl)-propane, 1,1-bis-(4-hydroxyphenyl)-cyclohexane and 1,1-bis-(4hydroxyphenyl)-3,3-dimethyl-5-methyl cyclohexane.

These diphenols are either known from the literature or may be produced by methods known from the literature. The same applies to the thermoplastic aromatic polycarbonates obtainable therefrom.

The aromatic polycarbonates may be branched by incorporation of small quantities, preferably 0.05 to 2.0 mol-% (based on diphenols used), of trifunctional or more than trifunctional compounds, for example those containing three or more than three phenolic hydroxyl groups.

These polycarbonates are also known from the literature or may be obtained by methods known from the literature.

Some of the compounds containing three or more than three phenolic hydroxy groups which may be used in accordance with the invention are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl) -phenol, 2,6-bis-(2'-hydroxy-5'-methyl benzyl)-4-methylphenol, 2-(4-hydroxyphenyl)-2-(2,4 dihydroxyphenyl)-propane,hexa-[4-(4-hydroxyphenylisopropyl)phenyl]-orthoterephthalic acid ester, tetra-(4-hydroxyphenyl)-methane, tetra-[4-(4-hydroxyphenylisopropyl)-phenoxy]methane and 1,4-bis-[(4',4'-dihydroxytriphenyl)-methyl]benzene. Some of the other trifunctional compounds are 2,4-dihydroxybenzoic acid, trimesic acid, cyanuric chloride and 3,3-bis-(4-hydroxy-3-methylphenyl)-2-oxo-2,3-dihydroindole.

The thermoplastic aromatic polycarbonates in question generally have weight average molecular weights $M_w$ of 10,000 to more than 200,000 and preferably 20,000 to 80,000, as determined by measurement of the relative viscosity in $CH_2Cl_2$ at 25° C. and at a concentration of 0.5 g in 100 ml $CH_2Cl_2$. Solutions of thermoplastic aromatic polycarbonates in organic solvents mainly accumulate where thermoplastic aromatic polycarbonates are produced by the known interfacial process or by the process in homogeneous solution, the so-called pyridine process.

Using these methods, a polycarbonate solution may be produced, for example, as follows:

In a suitable apparatus, 61.2 kg/h of a solution of 48.75 kg 2,2-bis-(4-hydroxyphenyl)-propane, 237 kg water, 39.4 kg 45% sodium hydroxide, 50 g sodium borohydride and 750 p-tert-butyl phenol are continuously phosgenated with 4.75 kg/h phosgene in 90 kg methylene chloride with addition of 3 kg/h 45% sodium hydroxide.

After addition of 40 g/h triethyl amine and 0.75 kg/h 45% sodium hydroxide, a polycarbonate having a relative viscosity of 1.303 is obtained after an average residence time of half an hour.

After separation of the aqueous phase, the organic polycarbonate solution is used for further processing after suitable dilution or concentration.

The solutions of thermoplastic aromatic polycarbonates in the organic solvents have concentrations of 3% by weight to 25% by weight and preferably 5% by weight to 20% by weight.

Suitable solvents apart from the $CH_2Cl_2$ already mentioned are any solvents which sufficiently dissolve the polycarbonates and which have a boiling point of not more than 150° C. Preferred solvents are methylene chloride, monochlorobenzene, toluene and mixtures of the solvents mentioned.

The steam used has a temperature of 100° C. to 300° C. and preferably 140° C. to 250° C.

The ratio of polycarbonate solution to steam is 0.5:1 to 6:1 and preferably 1:1 to 5:1.

The tube adjoining the point where the polycarbonate solution and the steam are combined has at least three cross-sectional constrictions in which its cross-sectional area is reduced to 40%–80% of the original area. The constriction extends over a length of at least 3 D, D standing for the original tube diameter, and is not sudden, but rather continuous to avoid blockages. After the constriction, the tube widens to its original cross-section.

The length of the tube is at least 50 D where D is as defined above.

The tube may be, for example, straight or spiral or may consist of straight tube sections connected by bends of any shape. In one preferred embodiment, the tube is heated to a temperature 10° C. to 40° C. below the glass transition temperature of the polycarbonate to be isolated.

By virtue of their extremely low residual solvent content, the polycarbonates isolated by the process according to the invention can be processed by known methods to various molded articles, including for example films, sheets and wires. Typical additives, stabilizers against UV light, heat and moisture, mold release agents, dyes, pigments or fillers, such as carbon black, or glass fibers may be added to the polycarbonates isolated by the process according to the invention before or during their processing.

The polycarbonate moldings obtained are used for typical applications, for example in electrical engineering, in the optical field, in vehicle construction and in the lighting industry.

The accompanying drawings show two examples of suitable tubes.

FIG. a shows a continuous cross-sectional constriction in a section along the tube.

FIG. b is a plan view perpendicularly of the tube axis of two different possibilities for the cross-sectional constriction. In example 1, the constriction is obtained by reducing the radius of the tube. In example 2, the constriction is obtained by the transition from a circular cross-section to an elliptical cross-section.

EXAMPLES

Example 1

7.5 kg bisphenol A polycarbonate having an average molecular weight $M_W$ of 29,800 are dissolved in 42.5 kg methylene chloride. 16 kg/h of this 15% polycarbonate solution are combined with 8 kg/h steam (15 bar =200° C.) in a Tee (internal diameter 4 mm). The third arm of the Tee is connected to a 100 cm long straight tube with an internal diameter of 4 mm. The cross-section of the tube decreases from 20 cm to 3 mm over a length of 30 mm. The polycarbonate particles issuing from the end of the tube are separated from water and solvent vapor in a cyclone.

The particles are dried in vacuo at 120° C. and the residual methylene chloride content is determined. The results are set out in Table 1.

EXAMPLE 2

Polycarbonate solution and steam are combined in the same way as in Example 1 except that the straight tube is replaced by a spiral tube of the same length and the same cross-section. The diameter of the spirals is 60 mm. The tube constrictions correspond to those of Example 1 in number and dimensions. The results are set out in Table 1.

EXAMPLE 3

Polycarbonate solutions and steam are combined in the same way as in Example 1 except that the straight tube is replaced by five 10 cm long tube sections connected by semicircular bends (diameter D=60 mm). The cross-sectional constrictions correspond to those of Example 1 and are situated in the straight sections. The results are set out in Table 1.

COMPARISON EXAMPLE 1

Polycarbonate solution and steam are combined in the same way as in Example 1 except that the straight tube with cross-sectional constrictions is replaced by a straight tube with no constrictions. The results are set out in Table 1.

COMPARISON EXAMPLE 2

Polycarbonate solution and steam are combined in the same way as in Example 2 except that the spiral tube with cross-sectional constrictions is replaced by a spiral tube with no constrictions. The results are set out in Table 1.

COMPARISON EXAMPLE 3

Polycarbonate solution and steam are combined in the same way as in Example 3, except that a tube with no cross-sectional constrictions is used. The results are set out in Table 1.

COMPARISON EXAMPLE 4

Polycarbonate solution and steam are combined in the same way as in Comparison Example 1, except that the 100 cm long tube with no constrictions is replaced by a 10 cm long tube. The results are set out in Table 1.

TABLE 1

| | Results of drying at 120° C./30 mbar | | | | | | |
|---|---|---|---|---|---|---|---|
| Example | 1 | 2 | 3 | C1 | C2 | C3 | C4 |
| Residual methylene chloride after 2 hours* | 40 | 25 | 30 | 40 | 20 | 20 | 25 |
| Residual methylene chloride after 6 hours* | <2 | <2 | <2 | 15 | 15 | 20 | 10 |

*All values for residual methylene chloride in ppm

We claim:

1. A process for isolating aromatic thermoplastic polycarbonates from solutions thereof in organic solvent, comprising dispersing the solution with steam to form a suspension of polycarbonate particles, condensed water and water/solvent vapor, drying the suspension in a tube with cross-sectional constrictions, and isolating the polycarbonate after drying.

2. The process of claim 1, wherein the tube is configured such that, in the constricted cross-sectional portions, the cross-sectional area of the tube is reduced by 40 to 80%.

3. The process of claim 2, wherein the tube is configured such that the length of the constricted portion is at least three times greater than the tube diameter, and the overall length of the tube is at least 50 times greater than the tube diameter.

4. The process of claim 1, wherein the tube is a straight tube.

5. The process of claim 1, wherein the tube is a spiral tube.

6. The process of claim 1, wherein the tube is heated to a temperature of 10° to 40° C. below the glass transition temperature of the polycarbonate being isolated.

* * * * *